March 3, 1970 — R. F. SHAW ET AL — 3,498,290

PULSED DOPPLER VOLUMETRIC BLOOD FLOWMETER

Filed April 22, 1966 — 7 Sheets-Sheet 1

INVENTORS
ROBERT F. SHAW
LOUIS B. LAMBERT
BY
OSTROLENK, FABER, GERB & SOFFEN
ATTORNEYS

INVENTORS
ROBERT F. SHAW
LOUIS B. LAMBERT
BY
OSTROLENK, FABER, GERB & SOFFEN
ATTORNEYS

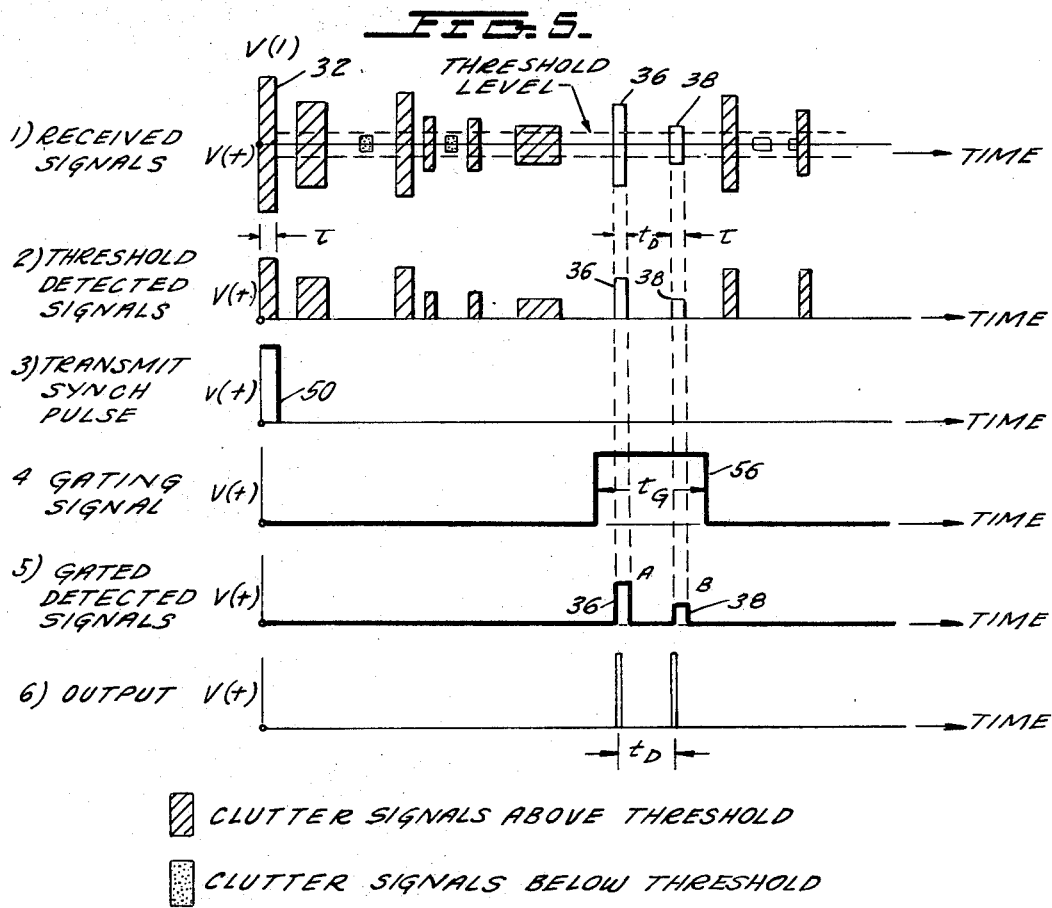
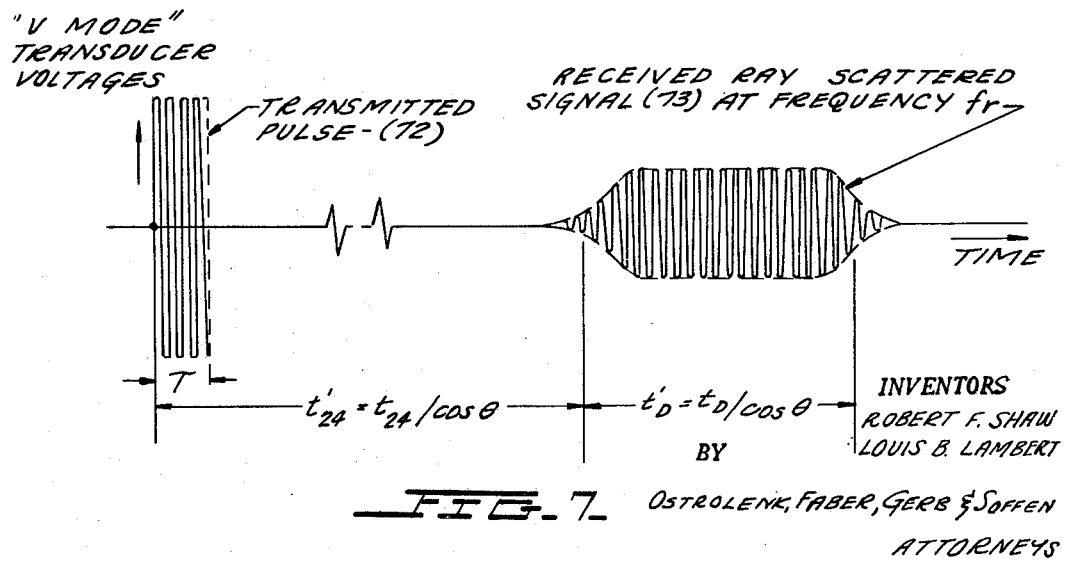

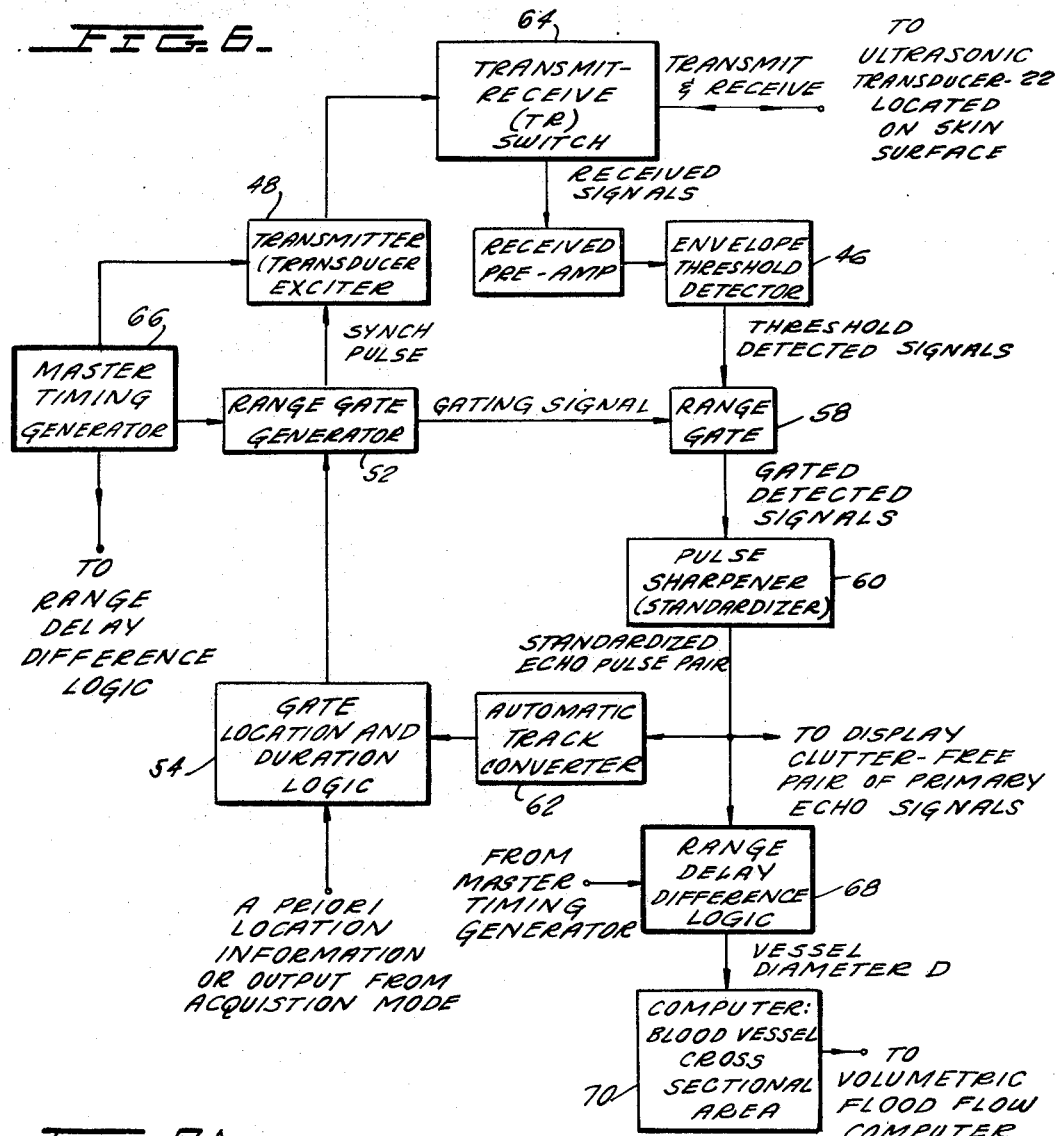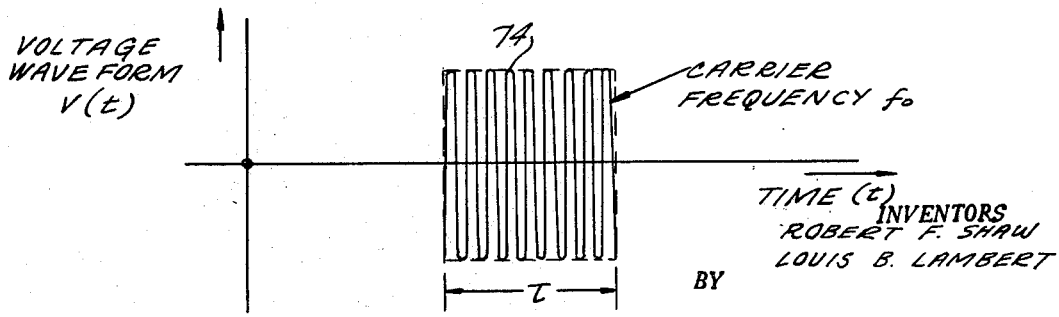

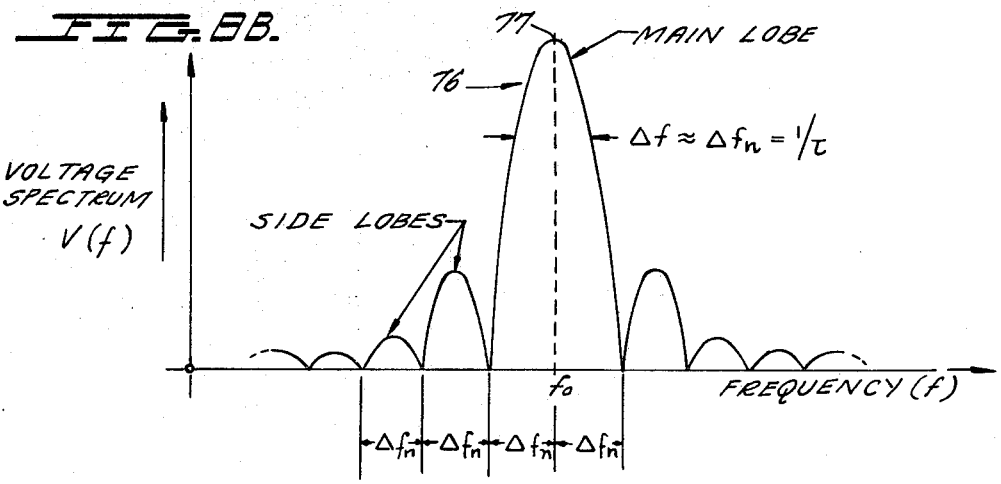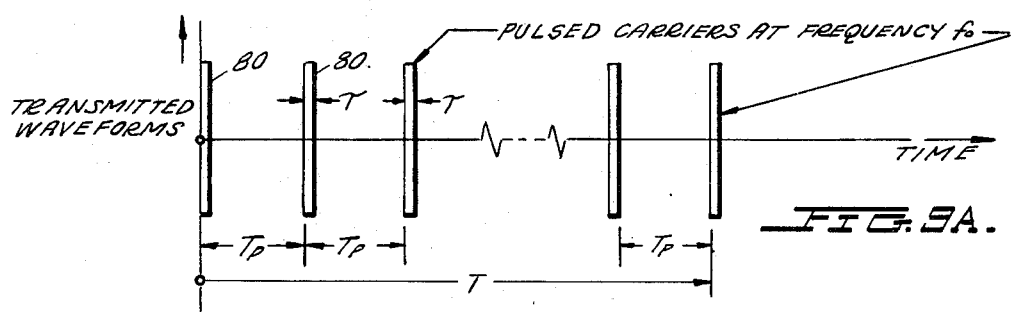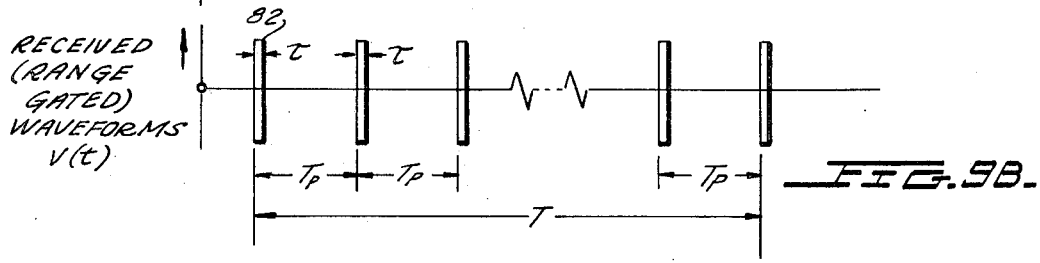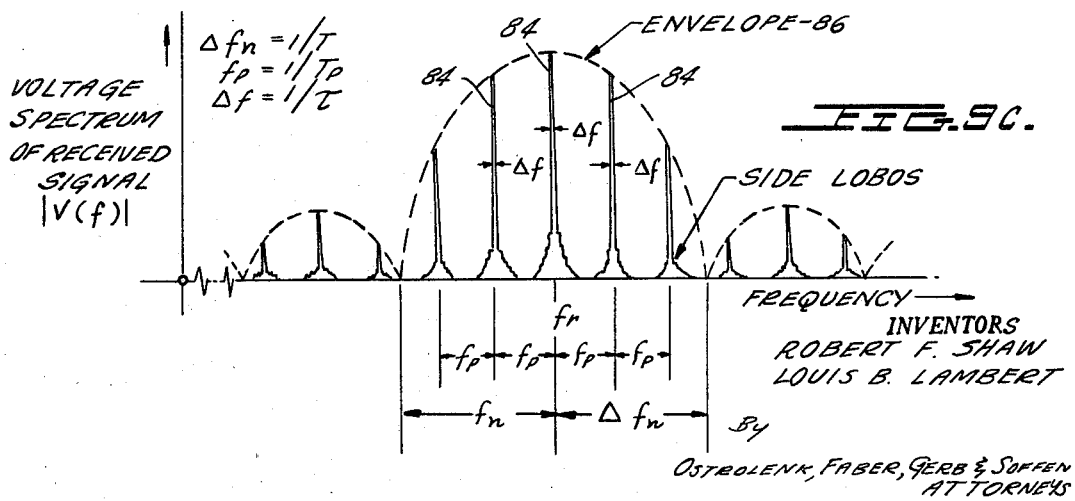

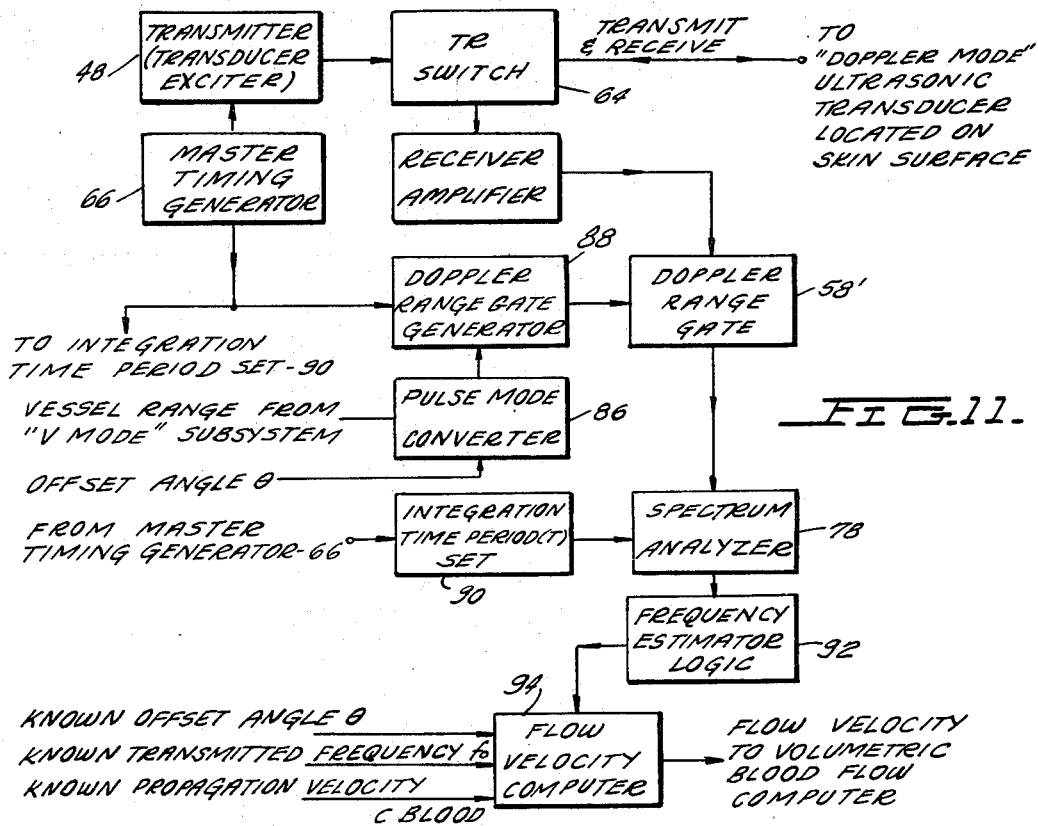
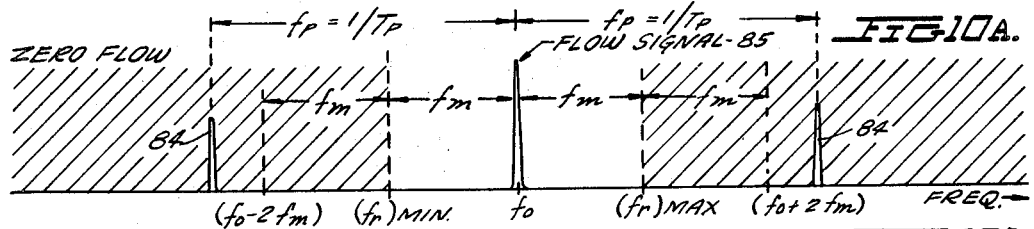
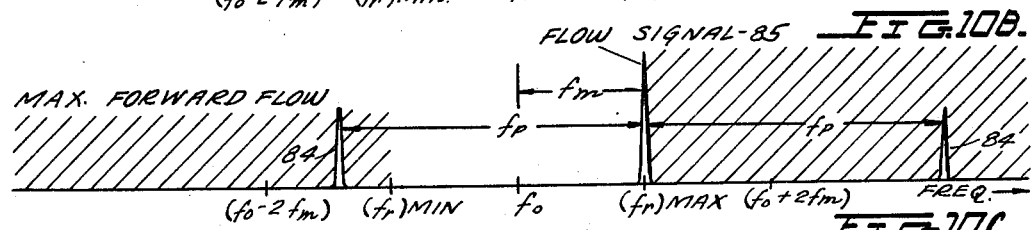
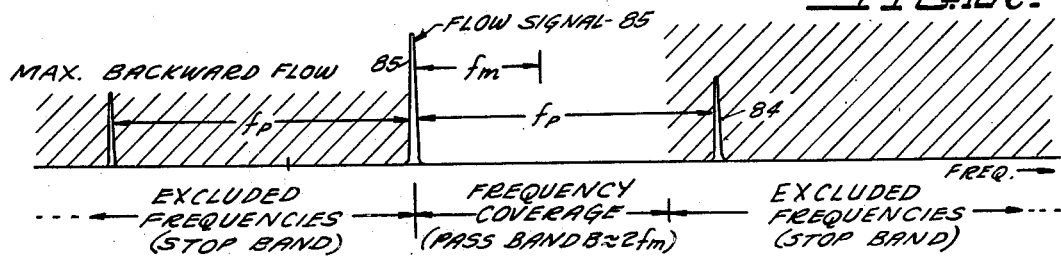

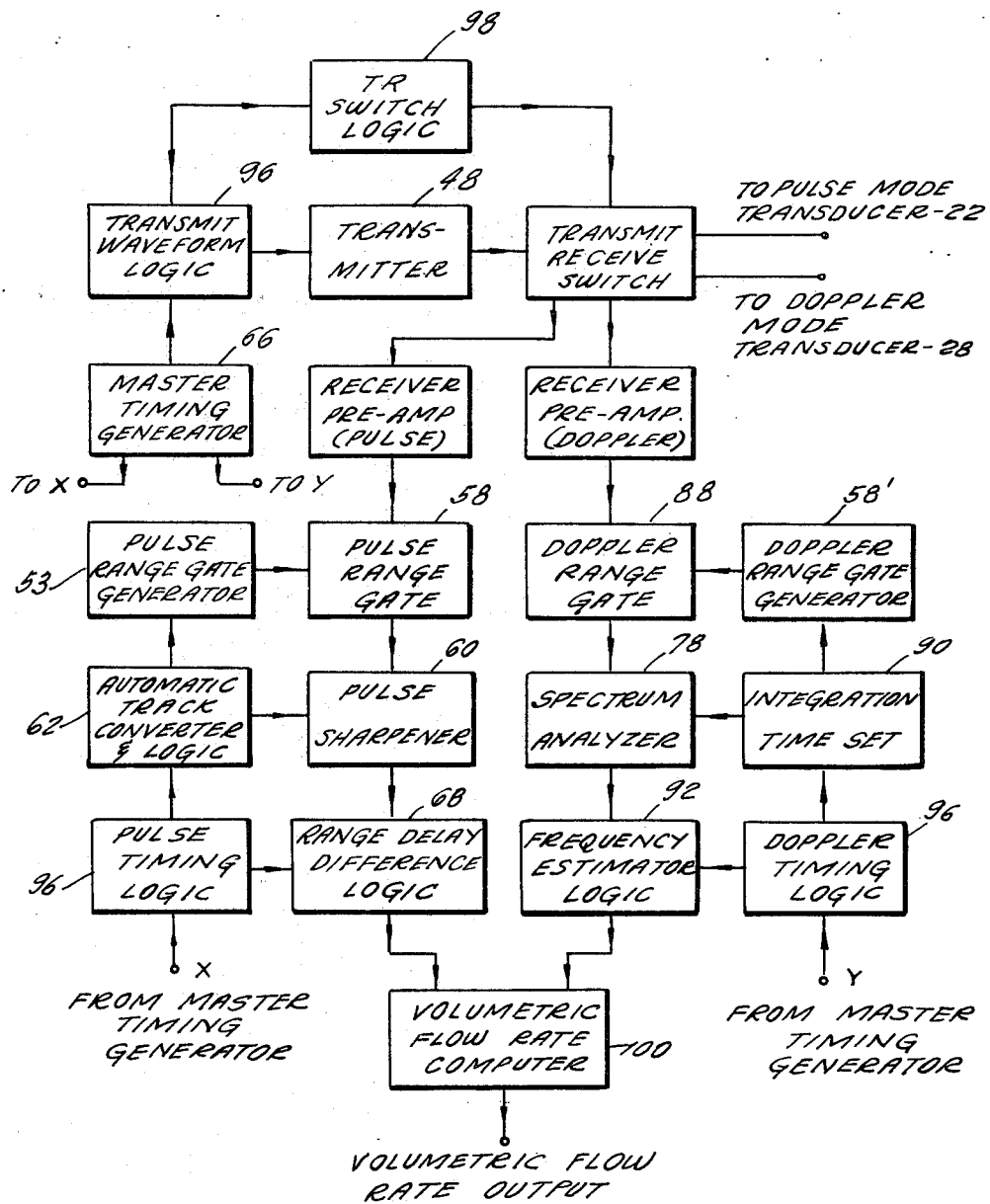

United States Patent Office 3,498,290
Patented Mar. 3, 1970

3,498,290
PULSED DOPPLER VOLUMETRIC
BLOOD FLOWMETER
Robert F. Shaw, 2316 Leavenworth St., San Francisco,
Calif. 94133, and Louis B. Lambert, 48 Vernon Place,
Mount Vernon, N.Y. 10552
Filed Apr. 22, 1966, Ser. No. 544,443
Int. Cl. A61b 5/02
U.S. Cl. 128—2.05
16 Claims

ABSTRACT OF THE DISCLOSURE

A volumetric blood flowmeter in which a first transducer locates and measures the diameter of a vessel and a second transducer determines the velocity of blood in the vessel by Doppler frequency shift techniques. The vessel diameter and velocity of blood therethrough are then used to compute volumetric flow through the vessel.

---

This invention relates to a volumetric blood flowmeter, and more particularly relates to an ultrasonic pulsed volumetric flowmeter which is capable of safely, accurately, and continuously computing volumetric blood flow through a given vessel of interest from the surface of the body of the subject under consideration.

The first two ranking causes of death in America today are coronary heart disease and stroke, with these two diseases alone being responsible for approximately 70% of American deaths each year. Both of these diseases are characterized by progressive narrowing and diminution of blood flow in one or more arteries nourishing the heart and brain, respectively. In each of these diseases, complete occlusion of the involved vessel, which brings about the "coronary" or "stroke," characteristically occurs without premonitory symptoms.

In both diseases the prime medical problem is an almost complete inability to make an appropriate diagnosis in asymptomatic individuals during the long interval that blood flow is gradually diminishing but before complete occlusion with its dire effects has occurred. Were accurate diagnosis possible, proper therapy could be instituted.

In an effort to provide the physician with instruments capable of diagnosing symptoms which may eventually lead to heart disease and stroke, the prior art has suggested various types of blood flowmeters for measuring blood flow velocity within a vessel. One such instrument includes a probe which must be inserted within the vessel under consideration, with such probe including upstream and downstream located transducers which determine the time difference between intermittently received upstream and downstream directed ultrasonic waves to provide an indication of the blood velocity through the vessel. Obviously the necessity of inserting a probe within the vessel of interest is cumbersome, and for many deeply seated vessels, presents an insurmountable obstacle. Further, the medical measurement of significance is volumetric blood flow rather than blood flow velocity. In fact, while volumetric blood flow measured at a locale of partial blood vessel occlusion is diminished below normal, blood velocity measured at this site may actually be normal or even greater than normal.

More recent blood flowmeters have suggested that the upstream and downstream located transducers may be positioned externally surrounding the vessel under consideration. These devices, of course, require surgical operation to position the transducers and hence are extremely limited in their applicability to blood flow measurement in humans. This same limitation applies to similar devices which utilize other measuring techniques (such as electromagnetic induction or the Doppler frequency shift of a continuously generated ultrasonic wave), but which require surgical operation to position them surrounding the blood vessel of interest.

Most recently, a Doppler flow detection device has been suggested which utilizes a transcutaneous mode of operation. This device is not capable of measuring either volumetric blood flow nor blood flow velocity, but can detect only the presence and most central characteristics of blood flow in vessels immediately beneath the transducer.

In contradistinction to prior art blood flowmeters, the instant invention provides a pulsed ultrasonic volumetric blood flowmeter which measures volumetric blood flow in the undisturbed vessel of a patient from the surface of his body. In its preferred embodiment, the instant invention actually comprises two or more transducers which are located on the skin of the subject under examination in the general region of the blood vessel of interest. Each of the transducers intermittently functions as transmitter and receiver and function to determine the diameter of the blood vessel or the velocity of blood flowing therethrough.

Specifically, a diameter-determining transducer is oriented substantially perpendicularly to the vessel and determines the diameter thereof by measuring the time delay between energy pulses reflected back toward the transducer by the closest and farthest walls of the blood vessel. As will be shown, the time delay between the reflected pulses is proportional to the diameter of the vessel. The velocity-determining transducer is oriented at a predetermined angle relative to the diameter-determining transducer and to the vessel under consideration and determines velocity of blood flow therethrough by measuring the Doppler shift of the frequency of an ultrasonic pulse transmitted, reflected by the suspended red blood cells, and received by the transducer. With diameter and velocity determined, the volumetric blood flow in the vessel is then easily computed.

In addition to a transmitter (transducer exciter) and a transmit-receive switch which permits a single transducer to alternately function in a transmission and receiving mode of operation, the instant invention provides that each of the transducers cooperate with electronic sub-systems which filter out spurious reflections of the transmitted ultrasonic pressure wave other than those reflections which provide the desired information. Specifically, and as will be further explained in detail, the electrical outputs of the diameter-determining transducers (which includes the primary reflections of the transmitted ultrasonic pressure wave pulses which are attributable to the closest and farthest vessel walls) are fed through clutter rejection circuits including normally non-energized gates which are energized at given instants and for given durations, dependent upon approximately known parameters, to permit only the primary reflections of interest to pass therethrough.

As a further feature of the clutter rejection subsystem which is responsive to the electrical outputs of the diameter-determining transducers, the instant invention provides the use of an automatic track converter for continuously updating the parameters which are utilized to fix the times of occurrence and durations of the energization of the aforementioned gates.

Similarly, the electrical output voltage of a pulsed blood velocity determining transducer (the frequency of which is compared to the originally transmitted frequency to determine velocity) is initially passed through a clutter rejection circuit similar to that described with respect to the diameter-determining transducer electronic sub-system, for eliminating reflections of the transmitted ultrasonic pressure wave other than those attributable to the red blood cells suspended within the moving blood plasma. In addition, the continuously computed range determined by the diameter-determining transducer system is used to update the parameters utilized to fix the time of occurrence of the energization of a normally nonenergized gate which is part of the velocity-determining electronic sub-system.

As a particularly advantageous feature, the instant invention provides that the electrical output of the clutter rejection circuit which filters the velocity-determining transducer be applied to a spectrum analyzer capable of determining the frequency of the red blood cell reflected pressure wave pulses by the utilization of Fourier concepts. Specifically, and as will be further described, the pulsed ultrasonic pressure wave generated by the velocity-determining transducer is comprised of a plurality of short, spaced apart bursts within a given time period, such that the frequency analysis of the reflected pulses is a series of spectral lines spaced apart by a frequency greater than the maximum frequency shift expected (corresponding to the greatest blood velocity expected) for the blood vessel under consideration. Thus, by choosing a pass band for the spectrum analyzer which is at least as great as the greatest frequency shift expected, but less than the frequency spacing between the spectral lines of the reflected energy pulses, the true frequency of the Doppler shifted reflected ultrasonic pulses may be clearly determined. Knowing the predetermined angle of the velocity-determining transducer relative to the vessel, the known transmitted frequency, the known propagation velocity constant for blood, and by determining the Doppler shifted reflected frequency, the flow velocity of the blood is computed, becomes a known parameter, and is combined with the vessel diameter measurement result to provide a continuous computation of volumetric blood flow.

Accordingly, it is an object of the instant invention to provide a pulsed Doppler, volumetric blood flowmeter capable of safely, accurately, and continuously computing volumetric blood flow for an undisturbed patient from the surface of his body in a rapid and painless fashion not requiring breaching of the body's integument.

Another object of the instant invention is to provide such a volumetric flowmeter which determines the velocity of blood flowing through a vessel under consideration by detecting the Doppler frequency shift of ultrasonic pulses reflected by the red blood cells suspended within the blood.

Still another object of the instant invention is to provide such a pulsed ultrasonic volumetric flowmeter which utilizes multiple transducers positioned on the surface of the skin of a subject in the general region of a vessel under consideration with one or more of such transducers alternately functioning as a transmitter and receiver to determine the diameter of the vessel under consideration by detecting the difference in time between reflections of transmitted ultrasonic pulses which are attributable to the walls of the vessel, and wherein one or more other transducers are oriented at predetermined angles relative to the vessel under consideration and function alternately as transmitters and receivers to determine the velocity of blood flowing through the vessel by detecting the Doppler shift in transmitted and received ultrasonic pulses attributable to the velocity of red blood cells suspended therein.

Another object of the instant invention is to provide such a pulsed ultrasonic volumetric flowmeter which includes electronic clutter rejection circuits which are responsive to the outputs of the respective transducers for eliminating reflections of the respective ultrasonic pulses other than reflections attributable to the walls of the vessel under consideration and the red blood cell, respectively.

Yet another object of the instant invention is to provide such a pulsed ultrasonic volumetric blood flowmeter wherein the electrical output of the velocity-determining transducers are frequency analyzed by a spectrum analyzer to determine the Doppler frequency shift attributable to the moving red blood cells.

Another object of the instant invention is to provide such a pulsed ultrasonic volumetric flowmeter wherein the ultrasonic pressure waves transmitted by the velocity-determining transducers thereof are comprised of a plurality of short bursts at predetermined intervals such that the frequency spectrum of the red blood cell reflected pulses consists of a plurality of spaced apart spectral lines, and wherein the spectrum analyzer has a pass band equal to or greater than the maximum frequency shift expected but less than the frequency spacing between the spectral lines of the reflected pulses whereby the true frequency shift of the blood cell reflected pressure wave may be clearly exhibited.

Other objects and a fuller understanding of the instant invention may be had by referring to the following descriptions and drawings, in which:

FIGURE 5 shows a timing diagram for the automatic clutter rejection circuitry of FIGURE 4;

FIGURE 6 shows the block diagram of an electronic sub-system for automatic tracking of a moving blood vessel and automatic computation of vessel cross-sectional area and includes the automatic clutter rejection circuitry shown in FIGURE 4;

FIGURE 7 shows the idealized wave forms transmitted and received by the "V-mode" transducer of FIGURE 1;

FIGURE 8a shows a voltage wave form which might be applied to the "D-mode" transducer of FIGURE 1;

FIGURE 8b shows the frequency spectrum of the wave form shown in FIGURE 8a;

FIGURE 9a shows a transmitted repetitive pulsed carrier which is applied to the "D-mode" transducer of FIGURE 1;

FIGURE 9b shows the corresponding range gated pulsed Doppler wave form received by the "D-mode" transducer;

FIGURE 9c shows the frequency spectrum of the pulsed Doppler wave form of FIGURE 9b;

FIGURES 10a, 10b and 10c, show the flow signal and the rejection of the ambiguities for conditions of zero flow, maximum forward flow, and maximum backward flow in the vessel shown in FIGURE 1;

FIGURE 11 is a block diagram of an electronic sub-system for the automatic computation of blood flow velocity which cooperates with the "D-mode" transducer shown in FIGURE 1;

FIGURE 12 is a complete block diagram for a pulsed Doppler volumetric flowmeter of the instant invention which automatically computes volumetric blood flow within a moving vessel.

Figure 1:
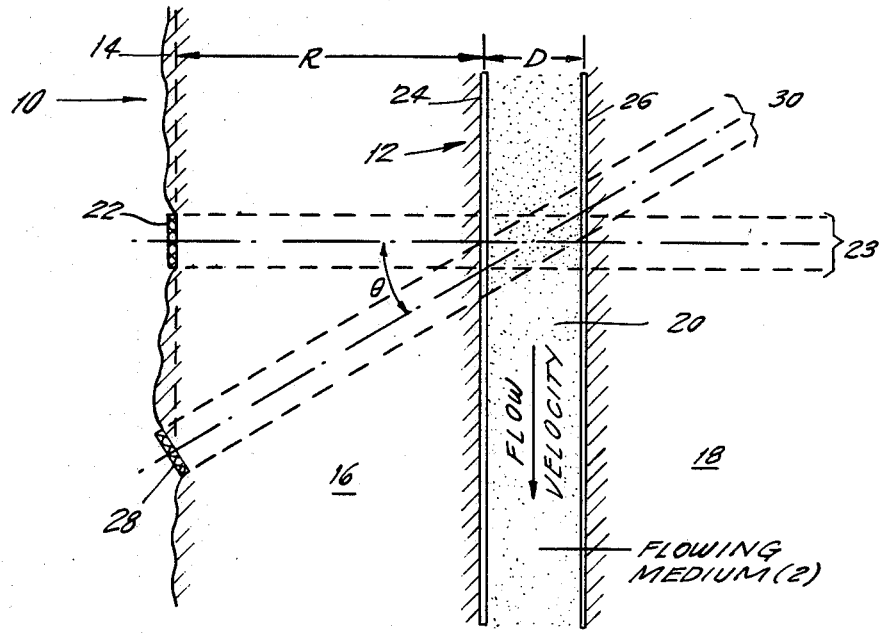
FIGURE 1 is a schematic representation of a two-transducer ultrasonic pulsed Doppler volumetric flowmeter of the instant invention as positioned on the surface of the body of a subject.

Referring to FIGURE 1, there is schematically shown a portion of the body 10 of a person whose volumetric blood flow is to be determined for a vessel 12 of diameter D which is located a given distance R behind the surface of the skin 14. For ease of illustration only the particular vessel 12 of interest is shown, it being understood that organs, tissues and other body components would actually exist in the media 16 and 18 immediately surrounding the vessel 12. As noted previously, the instant invention uniquely determines volumetric blood flow of vessel 12 by determining the diameter D thereof and the velocity of the red blood cells 20 suspended in and moving with the plasma flowing through the vessel.

To this end there is provided a first transducer 22 conveniently designated as a "D-mode" transducer located on the surface 14 of the body 10. Transducer 22 is oriented substantially perpendicular to the vessel walls 24 and 26, and, as will be further described, transmits ultrasonic pulses and receives the reflections thereof which are attributable to the walls 24 and 26 to provide an indication of the diameter D of the vessel 12.

A second transducer 28, conveniently designated a "V-mode" transducer, is similarly located on the surface 14 of the body 10 but is oriented at an off-set angle $\theta$ relative to the path of propagation 23 of the ultrasonic pulse produced by the pulsed mode transducer 22. As will be further explained, the "V-mode" transducer 28 transmits an ultrasonic pressure wave and receives the Doppler shifted reflections which are attributable to the moving red cells 20 which pass through the path of propagation 30 of the pressure wave produced by the transducer 28 to provide an indication of the velocity of the blood flowing through vessel 12. With vessel diameter and blood velocity determined, the volumetric blood flow is then readily ascertainable.

Since transducers are well understood by those skilled in the art, it unnecessary to describe transducers 22 and 28 in any great detail. For purposes of understanding, the instant invention it is sufficient to note that a transducer is essentially a device capable of transforming an electrical voltage into mechanical motion and vice versa and that a piezoelectric transducer constructed of barium titanate, $x$-cut quartz crystals or any other suitable material can be made to produce longitudinal mechanical vibrations in synchronism with applied voltage wave forms. These vibrations when coupled to a medium such as body 10, result in sinusoidal pressure pulses which travel through the medium at a speed C corresponding to the ultra propagation velocity for the medium. When these travelling waves reach mechanical impedance discontinuities such as represented by the vessel walls 24 or 26, or the suspended red blood cells 20, a fraction of the incident pressure pulse is reflected back toward the transducer. Upon reflection, a backward travelling wave is generated which, when it reaches the piezoelectric transducer causes a proportional voltage variation to appear at the electrical terminals thereof (the transmitter is, of course, deactivated at this point). Having outlined the fundamental operation of the transducers 22 and 28, the particular manner in which "D-mode" transducer 22 functions to determine the diameter D of vessel 12 will now be explained.

"D-mode" operation

Figure 2:
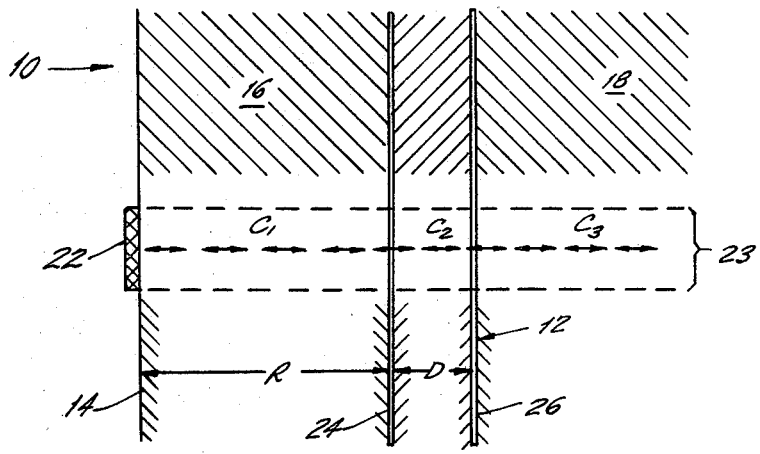
FIGURE 2 is a representation of one of the transducers of the instant invention positioned relative to the two reflecting surfaces which correspond to the walls of the vessel under consideration.

Turning to FIGURE 2, a portion of FIGURE 1 has been isolated and simplified to show only the "D-mode" transducer 22 positioned on the skin 14 substantially perpendicular to the vessel 12 under consideration. Medium 16 and 18 have propagation velocities of $C_1$ and $C_3$, respectively, while the flowing blood within vessel 12 has a propagation velocity of $C_2$. If the pulsed mode transducer 22 is excited with a pulsed voltage wave form 32 shown in FIGURE 3 which consists of a pulsed carrier having a duration $\tau$ and a sinusoidal carrier frequency $f_0$, the voltage wave forms which would be displayed by an oscilloscope monitoring reflections received by transducer 22 would appear as shown in FIGURE 3 at 34 and can be explained as follows.

The transmitted wave form starts at a time $t=0$ (by definition) and as noted above consists of a pulse of duration $\tau$ and carrier frequency $f_0$.

Figure 3:
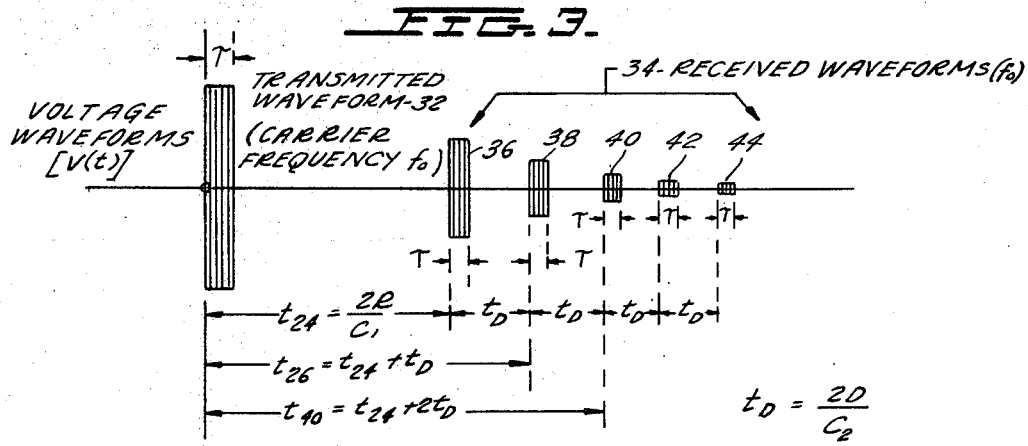
FIGURE 3 shows the voltage wave form expected when an ultrasonic pulse is directed toward the reflecting surfaces shown in FIGURE 2.

The first received wave form 36 in FIGURE 3 is due to a primary reflection from the vessel wall 24. This pulsed carrier occurs at a time $t_{24}=2R/C_1$ which is proportional to the distance R from the transducer 22 to reflecting wall 24. The amplitude of this reflection 36 is smaller than that originally transmitted.

The second received wave form 38 is due to a primary reflection from vessel wall 26. This pulsed carrier occurs at a time $t_{26}=t_{24}+t_D$, where $t_D=2D/C_2$, corresponding to the time of propagation $t_{24}$ in medium 16 over a distance 2R plus the time of propagation $t_D$ in the vessel 12 over a distance 2D. The amplitude of the reflection 38 is smaller than reflection 36 since it resulted from that fraction of the incident wave which was first transmitted through vessel wall 24 as an attenuated forward wave, then reflected from surface 26 as a smaller backward wave and finally transmitted through surface 24 again, this time as a backward wave of even smaller amplitude.

The third received reflection 40 is due to a secondary reflection of the fraction of the pressure wave that gave rise to wave form 38 but was instead reflected from surface 24 back toward surface 26. This wave form is observed at a time $t_{40}=t_{24}+2t_D$, and in fact all of the signals 40, 42, and 44 are due to multiple reflections contained within the vessel 12 which are finally transmitted through surface 24 back to the transducer 22. As a result the time delay between wave forms 36 and 38, 38 and 40, 40 and 42, etc. are all equal to $t_D$, the time to propagate a distance 2D in the vessel 12.

It is important to note that (1) the first received reflection 36 occurs at a time which is proportional to R, the distance between the transducer and the first vessel wall 24; (2) the time difference $t_D$ between any two succeeding received reflections is proportional to the diameter D; and (3) the received signals having the largest amplitudes are due to primary reflections, that is, those attributable to the walls 24 and 26.

Generally, there will be impedance discontinuities along the propagation path 23 in addition to vessel walls 24 and 26. If these discontinuities occur in medium 16 then additional echos (received wave forms) will appear in FIGURE 3 between the transmitted pulse 32 and the first received reflection 36. Similarly discontinuities in medium 18 result in additional signals appearing after the occurrence of wave form 38 (the primary reflection from wall 26). Also, any discontinuities within the blood vessel 12 will appear as signals located between the primary reflections 36 and 38. However, reflections from discontinuities present in the vessel 12 are small compared to reflections 36 and 38 and can be ignored.

As the measurement of the vessel diameter D will eventually be utilized to compute volumetric blood flow it is imperative to reject all of the received clutter signals due to spurious discontinuities in medium 16 and 18 as well as the secondary reflection signals 40, 42 and 44, shown in FIGURE 3.

This is accomplished by setting the clutter rejection circuits to be subsequently described for the approximate location of the blood vessel of interest so that proper decisions are made automatically. In order to determine the approximate location of the blood vessel of interest (R of FIGURES 1 and 2) the transducer 22 is first used in an acquisition mode of operation. The acquisition mode of operation is similar to the diagnostic ultrasonic echo mode that has been successively employed in the prior art to locate and measure various anatomical structures and is used in the practice of the instant invention merely to approximate the distance R shown in in FIGURES 1 and 2.

Figure 4:
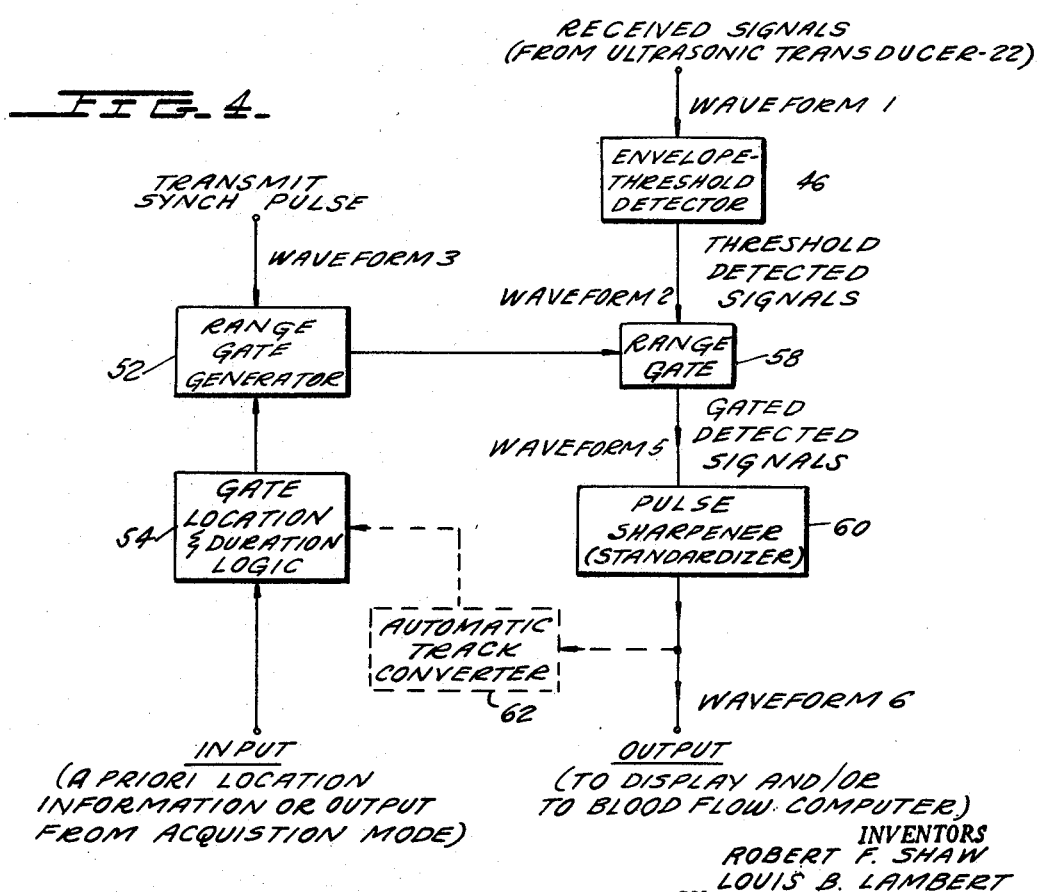
FIGURE 4 shows the simplified block diagram for automatic clutter rejection circuitry utilized with the transducer shown in FIGURE 2.

The circuitry necessary to obtain automatic clutter rejection is shown in block diagram form in FIGURE 4, with the timing (wave form) diagram for these circuits being depicted in FIGURE 5 for one complete cycle of operation. The sub-system operates as follows. The reflections received by the ultrasonic transducer 22 consists of a series of pulsed carriers as shown in FIGURE 5 (wave form 1). Only the signals 36 and 38 are due to primary reflections from the vessel walls 24 and 26 while all other signals are clutter signals due to discontinuities along the path of propagation 23 and secondary reflections from the vessel walls 24 and 26. The entire wave form 1 is first supplied to an envelope threshold detector 46 shown in FIGURE 4.

The threshold detected signals appear as shown in FIGURE 5 (wave form 2). This unipolar, video-type wave form, only contains those signals which exceed the threshold level which is preset to reject low level noise signals without excluding the primary echo signals 36 and 38 attributable to the walls 24 and 26.

A transmitter 48, see FIGURE 6, produces a transmit synch pulse 50 (wave form 3) which is employed to synchronize a range gate generator 52 to the transmitted wave form 32 (that is, establish a common zero time for the beginning of the transmission of the wave form 32 and the beginning of the time of occurrence computation for the range gate generator 52). In addition the gate location and duration logic 54 converts by suitable circuitry (not shown), the approximately known distance R and approximately estimated diameter D information obtained by the use of the transducer 22 in the aforementioned acquisition mode of operation into an electrical signal capable of setting the time of occurrence and duration of a gating signal 56 (wave form 4) relative to the synchronizing pulse 50.

A normally non-energized range gate 58 is responsive to the application of the gating signal 56 to change to a conducting state whereby only those signals from the output of envelope threshold detector 46 which occur within a time period $t_G$ corresponding to the duration of the gating signal 56 will be passed therethrough. Generally the duration $t_G$ of the gating signal 56 exceeds the total duration of the primary echo pair 36, 38 such that the primary reflection pair will always be passed by the range gate 58. As the time of occurrence and duration of the gating signal 56 is determined by the previous information obtained during the acquisition mode of operation (approximate range and approximate diameter), only the primary reflections 36 and 38 will be passed through the range gate 58 while all other clutter signals will be rejected. For example, range gate 58 might be normally non-conducting diodes which are switched to their conducting state only on the application of the gating signal 56.

The gated wave form 5 in FIGURE 5 now only contains the primary reflections 36 and 38 which may be passed to a pulse sharpener 60 used to produce a pair of standard pulses as shown in FIGURE 5, wave form 6. This standardized wave form can be used to (1) display the vessel diameter (and location range R) information, and/or (2) as will be further explained, act as an input to computer which in combination with flow velocity information is used to automatically determine volumetric blood flow.

As noted previously, the instant invention contemplates that automatic means be provided for continually updating the parameters which are utilized to fix the time of occurrence and duration of the gating signal 56, thus eliminating the necessity of utilizing transducer 22 in its acquisition mode of operation every time the vessel of interest moves outside the initially determined range gated time period $t_G$. To this end there is provided an automatic track converter 62 having appropriate logic circuit (not shown) designed so that upon command the automatic track converter output overrides the original information obtained during the acquisition mode of operation. In this manner, the primary echo pulse pair 36, 38 containing up-to-date information as to range R and diameter D is immediately employed through the gate location and duration logic 54 to properly set the range gate generator 52 for the next cycle of operation whereby the time of occurrence and duration of the next gating signal 56 that is produced to activate the range gate 58 can now more closely match the expected location and width of primary echo pair 36, 38 received after the next transmission.

Since ultrasonic transducer 22 can be excited quite frequently (typically 1 pulse every 200 μsec.), a new set of primary echos 36, 38 appears equal rapidity. During the short time interval between pulses, the physical changes in blood vessel location and vessel diameter are small, such that these small changes are accounted for by simply making $t_G$ slightly larger than $t_D + \tau$.

Thus, as the primary echo pair 36, 38 changes in location and spacing over many complete cycles of operation, the feedback nature of the automatic track converter 62 will cause the gating signal 56 to automatically follow, and clutter rejection is thereby continuously obtained.

The techniques described above can now be combined into a complete electronic sub-system which performs the functions of tracking, clutter rejection, and computation of blood vessel cross-sectional area. A block diagram for such system is shown in FIGURE 6 wherein like numbers have been utilized to represent components previously described and additional components are denoted by heavier outlines. Specifically, a TR switch 64 is introduced to permit the transducer 22 to function in both a transmission and receive mode of operation and a master timing generator 66 is added as a central synchronizing and clock source. In addition, range delay difference logic 68 is added to convert the time delay $t_D$ between the echo pair 36, 38 into a direct measure of vessel diameter which would appear typically as a digital number. This signal may be fed to a simple computer (multiplier) 70 which produces a digital number corresponding to the cross-sectional area of the blood vessel of interest 12. As will be further described, the vessel area may then be fed to a volumetric blood flow computer (not shown in FIGURE 6) which also receives the blood velocity information to provide the volumetric flow desired. Since a new independent measure of blood vessel cross-section is obtained following each transmit pulse 32, and since the repetition frequency is high (approximately 5,000 pulses per second) a "moment-by-moment" computation of vessel area is obtained.

"V-mode" operation

Having obtained a "moment-by-moment" measurement of vessel cross-sectional area, the desired volumetric flow rate of blood can be obtained if the flow velocity is also measured. To accomplish this, the second "V-mode" transducer 28 is preset on the skin surface 14 at a known offset angle $\theta$ as shown in FIGURE 1. As was the case for transducer 22, transducer 28 is excited with a pulse 72 (see FIGURE 7) of width $\tau$ and carrier frequency $f_0$, and an ultrasonic traveling (pressure) wave is produced. In this case, only that portion of the wave transmitted through the reflecting surface 24 into the flowing medium is of interest (because of the offset angle $\theta$ the reflections from vessel wall 24 and 26 do not return along the path of propagation 30 back toward transducer 28).

As will be discussed in greater detail, the red blood cells 20 suspended in the blood plasma flowing through vessel 12 act as Rayleigh scatterers and re-radiate a fraction of the transmitted pressure wave 72 back toward the transducer 28 along the offset angle path 30. The reflected wave is composed of the phasic sum of the pressure waves reflected from the particles contained within the region common to both the vessel and the ultrasonic path 30. As a result, it can be shown that the received wave form 73 (FIGURE 7) now consists of a pulsed carrier occurring at a time $t'_{24} = t_{24}/\cos\theta$ and for a duration $t'_D = t_D/\cos\theta$ where, as discussed previously, $t_{24} = 2R/C_1$ and $t_D = 2D/C_2$.

Also, if the red cells 20 are moving vertically down, as shown in FIGURE 1, the received carrier frequency, $f_r$ in FIGURE 7 is no longer equal to the transmitted frequency $f_0$, but in fact it can be shown that for a fixed offset angle $\theta$, the frequency difference $(f_r - f_o)$ is proportional to the Doppler frequency $f_d$, which is in turn proportional to the flow velocity S of the moving red blood cells 20. In fact, it can be shown that Equation 1

$$S = (C_{B/2 \sin \theta}) \times \left(\frac{f_d}{f_o}\right)$$

where

S = the velocity of the moving red cells 20,
$C_B$ = the velocity propagation constant for blood,
$\theta$ = the offset angle shown in FIGURE 1,
$f_d$ = the Doppler frequency shift $(f_r - f_o)$; and
$f_o$ = the transmitted frequency.

For the geometry shown in FIGURE 1 the received frequency $f_r$ is greater than transmitted frequency $f_o$ and this is defined as a positive Doppler frequency shift. Blood flow in the opposite direction, verticaly up in FIGURE 1, would produce $f_r$ less than $f_o$ and the Doppler frequency shift would be negative.

Since the "V-mode" signal occurs at a time $t'_{24}$ which is proportional to the time $t_{24}$ that is measured during the "D-mode" operation of transducer 22, for a fixed and known offset angle $\theta$, the time of occurrence and the duration of the Doppler shifted Rayleigh scattered signal 73 are entirely predictable. Thus, and as will be further described, a clutter rejection circuit similar to that previously discussed for the "D-mode" sub-system may be utilized to reject all signals other than those containing the velocity information.

By measuring the received frequency $f_r$ and knowing the transmitted frequency $f_o$, the offset angle $\theta$, and the velocity of propagation in blood, $C_2$, the utilization of Equation 1 now makes possible the computation of flow velocity S. Combining the flow velocity S with the cross-sectional area of the vessel as determined by the pulse mode sub-system, the volumetric flow rate can then be computed.

Thus, the carrier frequency $f_r$ of the received Rayleigh scattered signal must be extracted from the reflections received by transducer 28. The techniques utilized to implement this function are discussed below.

The fundamental concepts and techniques that are utilized to extract the reflected carrier frequency $f_r$ from received signal 73 is based on Fourier spectrum concepts. Over 150 years ago Fourier showed that any real wave form can be decomposed into a sum of sinusoidal wave forms, with each sinusoid having a unique amplitude, frequency, and phase. In the discussion thus far developed, the various voltage wave forms were characterized by plotting the moment-by-moment variation of the voltage amplitudes as a function of time. By utilizing Fourier analysis techniques, however, this same wave form can be characterized by plotting the amplitude of each sinusoidal component thereof as a function of the frequency of that component; and to be complete, plotting the phase of each component also as a function of frequency. Since the instant invention is concerned with only the frequency content of wave forms, the phase plot is not included in further discussion, and only the magnitude of the amplitude component will be considered as a function of frequency.

As a first example, consider the pulsed carrier wave form 74 shown in FIGURE 8a. It can be shown that the wave form 74 is composed of the sum of all sinusoids having a continuous frequency distribution, usually referred to as the frequency spectrum $v(f)$ of the wave form $v(t)$ and is shown in FIGURE 8b.

The frequency spectrum 76 is centered at the carrier frequency $f_o$ and the peak-to-first null width $\Delta f_n = 1/\tau$, where $\tau$ is the duration of pulse 74 in FIGURE 8a. Thus, if a spectrum analyzer is available which produces the frequency spectrum shown in FIGURE 8b when the input signal is that shown as 74 is FIGURE 8a; the carrier frequency $f_o$ can be determined by locating the peak 77 of the output response 76. For a typical spectrum analyzer, the accuracy of the estimate of carrier frequency $f_o$ is proportional to the peak-to-null width $\Delta f_n$. Thus, to a first approximation, a simple type of frequency estimator operating on the output of an ideal spectrum analyzer can be considered as producing an estimate $f_o$ which is dependent on the pulse duration, i.e., $\Delta f_n = 1/\tau$. As the pulse duration is increased, the ability to estimate carrier frequency is improved since the peak-to-null width $\Delta f_n$ decreases. In the limit, as the pulse width is extended to include all of time ($\tau$ approaches infinity) the spectrum approaches an easily ascertainable line spectrum indicating that only one frequency of a finite is present.

As indicated in FIGURE 7, the "V-mode" transducer produces an output pulse 73 having a width $t'_D$ which is determined by the diameter of the blood vessel, D, and the offset angle $\theta$. Because of practical considerations, such as attenuation in blood and the flow profile, the pulse width is effectively limited such that the useful portion of the received Rayleigh scattered signal 73 is approximately equal to the pulse width $\tau$ of the transmitted signal 72. As a result, the frequency resolution $\Delta f$ is limited (recall that $\Delta f = 1/\tau$) and this, in turn, limits the measurement accuracy of flow velocity and volumetric flow rate.

In order to alleviate this apparent limitation on measurement accuracy, it is necessary to increase the duration of the signal that is applied to the spectrum analyzer such as 78 in FIGURE 11. This is accomplished by taking advantage of the fact that the "V-mode" transducer 28 is pulsed periodically so that the received Rayleigh scattered signal occurs repeatedly at the same repetition rate as the transmitted signal. Ideally, the transmitted signal is shown in FIGURE 9a and comprises a plurality of pulses 80 of duration $\tau$ occurring at spaced intervals $T_p$ within a predetermined time period T, and causes the received signal to appear as shown in FIGURE 9b as including a plurality of pulses 82 of duration $\tau$ and carrier frequency $f_r$ (Doppler shifted) occurring at spaced intervals $T_p$ within the time period T.

The resulting frequency spectrum of the received pulsed Doppler wave form of FIGURE 9b can be shown to be composed of a series spectral "lines" 84 as shown in FIGURE 9c. For a wave form in FIGURE 9b having a total duration T, and interpulse period $T_p$ and a pulse carrier duration $\tau$ at a frequency $F_r$ the important characteristics of the pulse Doppler spectrum can be summarized as follows.

Each spectral line 84 has a finite width $\Delta f$ which is inversely proportional to the intermittent pulse period $\tau$. The frequency separation $f_p$ between spectral line 84 is equal to the reciprocal of the interpulse period $T_p$. Note that when time period T is large compared to the interpulse $T_p$, then the frequency separation $f_p$ between spectral lines 84 is large compared to the frequency resolution $\Delta f$.

The entire spectrum of FIGURE 9c is weighted by an envelope 86 which is a function of the total time T, that is, $\Delta f_n = 1/T$.

The spectrum of FIGURE 9c is centered at a frequency $f_r$, which is the carrier frequency of the received Doppler shifted signal. Thus, when the received frequency $f_r$ changes, the entire spectrum shifts by an equal amount, but the frequency resolution in the spacing between adjacent spectral lines remains constant.

The only spectral line of real interest in FIGURE 9c is the one located at the receive carrier frequency $f_r$. All other spectral lines appear essentially as ambiguities due to the fact that the waveform has a finite (and known) interpulse period $T_p$. These ambiguities may be eliminated as possible sources of error in estimating the true carrier frequency $f_r$ by selecting the interpulse period $T_p$ between pulses 80 in FIGURE 9a to produce a line spacing $f_p$ in FIGURE 9c which is somewhat greater than the maximum Doppler shift ($f_r-f_o$) that is likely to occur within the vessel of interest.

Since $T_p$ is a system design constant, and since the maximum expected flow velocity is well established for the blood vessels of interest, all ambiguities can be eliminated. The result of designing a system which produces a received Rayleigh scattered waveform having a proper interpulse period $T_p$ is shown in FIGURES 10a, 10b and 10c.

In these figures, three specific conditions are depicted, i.e., zero flow through the vessel, FIGURE 10a; maximum forward flow in the vessel, FIGURE 10b, and maximum reverse flow FIGURE 10c. In any case, the true flow signal 85 always exists between the frequencies $f_r$ (min.) and $f_r$ (max.). This brackets the total Doppler frequency shift $2f_m$ for backward and forward flow.

In accordance with the instant invention, the interpulse period $T_p$ has been chosen so that the ambiguities 84 from FIGURE 9c never fall in the frequency coverage of the interest, i.e., within the pass band $B-2f_m$ which is achieved by limiting the frequency coverage of the spectrum analyzer which operates on the pulse Doppler waveform of FIGURE 9b thereby permitting only the main spectral line 85 of interest to pass therethrough. In all cases, the frequency resolution or accuracy associated with the flow signal is $\Delta f_n \cong 1/T$ where T is the total time period. This is to be contrasted with a resolution of $f=$to $1/\tau$ which would have been possible had the waveforms of FIGURES 8a and 8b represented the voltage and frequency analysis respectively of the pulses received by transducer 28.

Since the "V-mode" sub-system operates at an extremely high repetition rate, many independent samples of blood flow velocity are obtained which produce an independent measure as each time period T is allowed to elapse. Thus, by use of Equation 1, moment-by-moment variations of flow velocity are obtained as the prime output and, if desired, such information can be smoothed to give an accurate measure of average flow either for each heart beat cycle or over many such cycles. When these measurements are properly combined with the moment-by-moment vessel cross-sectional area measurement obtained from the pulse mode transducer, then both the instantaneous volumetric blood flow and the average volumetric blood flow can be automatically computed.

Turning to FIGURE 11, there is shown a block diagram of the electronic sub-system for automatically computting the blood flow velocity within the vessel 12 in accordance with the manner outlined above. A master timing generator 66, the transmitter 48, a T-R switch 64, and receiver preamplifiers are similar in function to those previously discussed for the "D-mode" sub-system and need not be discussed again.

A normally non-conducting Doppler Range Gate 58' forms part of the clutter rejection circuit of the "D-mode" sub-system and changes to a conducting mode at the precise time ($t'_{24}=T_{24}/\cos \theta$) and for the proper duration ($t'_D=t_D/\cos \theta$), by the application of the vessel range R (determined by the "D-mode" sub-system) and the offset angle $\theta$ to a Pulse Mode Converter 86 which converts such information to a proper electrical signal and passes it on to a Doppler Range Gate Generator 88 which applies the proper gating signal to the range gate 58', thereby allowing only the reflections caused by the red blood cells 20 of FIGURE 1 to be passed on to the spectrum analyzer 78.

The total time period T for the spectrum analyzer 78 is set by an Integration Time Set 90 and synchronized by employing an appropriate signal from the master timing generator 66 as shown in FIGURE 11.

As discussed previously, the wave form of FIGURE 9a which is transmitted by transducer 28 is chosen such that the frequency spectrum produced by an analyzer 78 is a series of lines separated by a frequency ($1/T_p$) greater than the maximum frequency shift expected for the vessel of interest, and the pass band B of the spectrum analyzer 78 is chosen such that only the true flow signal 85 shown in FIGURES 9c and 10a, 10b and 10c will be passed through the analyzer 78.

Finally, the output of the spectrum analyzer 78 is fed to a Frequency Estimator Logic circuit 92 which converts the output of the spectrum analyzer 78 into a signal which can be conveniently used by a flow velocity computer 94 to continuously calculate flow velocity S in accordance with Equation 1.

The "D-mode" sub-system of FIGURE 6 can now be combined with the Doppler mode sub-system of FIGURE 11 to form a single unit which produces volumetric flow rate as a prime output. The block diagram for this pulsed Doppler flowmeter is shown in FIGURE 12.

The entire system is synchronized from the master timing generator 66 and includes virtually all of the components previously referred to in the isolated discussions of the pulse mode and Doppler mode transducers 22 and 28. In addition, various logic circuits illustrated as 96 have been added to operate the transmitter 48, range gates 58 and 88 spectrum analyzer 78, computing circuits, etc. By introducing T-R switch logic 98 of suitable circuitry (not shown) it is possible to produce the excitation required for the two transducers 22 and 28 in a single transmitter.

The received signals from each transducer are maintained on separate lines in order to avoid cross-talk which can occur for certain physical geometry between transducers and blood vessels. Thus, the received signals are processed in parallel channels (pulse channel and Doppler channel) and the resulting moment-by-moment measure of vessel cross-sectional area obtained from the pulse channel is combined with measures of flow velocity obtained from the Doppler channel in a single computer 100 capable of determining volumetric flow by merely obtaining the product of several numbers in accordance with the equation Equation 2

Flow rate$=\pi/32 \times (C_B/(f_o \sin \theta)) \times f_d (\Delta t)^2 m.^3$/sec.

where, $C_B=$the velocity propogation in blood,
$f_o=$the frequency of the pulse transmitted by transducer 28,
$\theta=$the offset angle shown in FIGURE 1,
$f_d=$the Doppler frequency shift ($f_r-f_o$), and
$\Delta t=$the time delay between primary pulses 36 and 38 determined by the pulse mode sub-system.

As has been noted previously, in various instances the instant invention takes advantage of the high repetition rate at which the transducers 22 and 28 are excited. Various consideration must be taken into account when determining such repetition rates. For example, for determining diameter, the time interval between input pulses to transducer 22 must be at least greater than twice the time required for a single pulse to travel to and through the blood vessel examined. Indeed, the interval should be large enough so that echoes from deeper structures should not interfere with the next pulse. Thus, the process of locating the vessel and measuring its diameter suggests a relatively low pulse repetition frequency for transducer 22.

On the other hand, the back scattered signal which is of interest when determining blood velocity S, must be frequently analyzed in order to extract the value $f_d$. If S is to be determined to a 1% accuracy, there will necessarily be required 100 resolution elements within a given time period T (that is, 100 input pulses of duration $\tau$ within the period T shown in FIGURE 9a). However, in order to be able to display pulsetile flow as well as mean flow, there should be many periods, T, per heart beat. Thus, for a clear display of pulsetile flow and precise measurement of S, the time period T should be as short as possible and hence the pulse repetition frequency should be very high.

These antagonistic constraints on pulse repetition frequency must be compromised. For example, if a preferred time period T of 15 milliseconds is chosen the following limits are set.

Assuming that the pulsetile portion of flow occupies ⅓ of the pulse beat of a human heart, a heart rate of 60 beats per minute, 1 beat per second, corresponds to 333 milliseconds duration for a single pulsetile portion of the beat of interest. With a time period T of 15 milliseconds, there can be approximately 22 time periods T per pulsetile portion of a single pulse. At a higher rate of 120 beats per minute, 2 beats per second, a time period T of 15 milliseconds permits 11 time periods, T, per pulse which allows for a reasonably clear display.

A time period T of 15 milliseconds further corresponds to a bandwidth of 67 c.p.s ($\Delta f = 1/T$). From Equation 1 for $C = 1.5 \times 10^3$ m./sec., $f_0 = 10^7$ c.p.s., $\theta = 45°$ and $\Delta f = 67$ c.p.s., it is found that $\Delta S = .67$ cm./sec. Since the mean velocity in the largest arteries of the body can be as high as 50 to 75 centimeters per second, and during pulses may be as much as 3 to 4 times greater, a total time period T of 15 milliseconds will allow approximately 1% or better precision when measuring blood velocity.

With a pulse period T of 15 milliseconds and 100 resolution elements, $T_p$, that is the interval between pulse, equals $1.5 \times 10^{-4}$ second. For a sonic propagation velocity of $C = 1.5 \times 10^3$ m./sec., a single pulse will penetrate 22.5 centimeters before the next pulse is introduced. Since typically the blood vessels in question will be closer than 15 centimeters from the transducers, and the aorta, for example, will be less than 10 centimeters away, the combination of such a long period between pulses and attenuation of the various body tissues will minimize the intensity of spurious reflections and prevent their masking the echoes of interest.

Thus, a time period T of 15 milliseconds with a pulse repetition frequency of 6,700 cycles per second satisfies the conflicting requirements mentioned earlier and as such represents the preferred time period T and pulse repetition frequency to be utilized with the Doppler mode transducer 28.

Thus there has been described a volumetric blood flowmeter capable of safely, accurately and continuously computing volumetric blood flow in the undisturbed vessels of a patient from the surface of his body by utilizing multiple transducers, one or more of which determines vessel diameter by detecting the time difference between reflections caused by mechanical impedance discontinuities attributable to the walls of the vessel, and other transducers of which determine the velocity of the blood flowing through the vessel of interest by detecting a Doppler frequency shift of ultrasonic pulses reflected back towards these transducers by the red blood cells suspended within the blood.

Although there has been described preferred embodiments of the instant invention, many variations and modifications will now be apparent to those skilled in the art. Therefore, this invention is to be limited, not by the specific disclosure herein, but only by the appending claims.

What is claimed is:

1. A flow meter for determining the volumetric flow of a fluid through an elongated vessel which is located beneath a surface and has an unknown depth comprising:
   first transducer means adapted to be positioned on said surface for directing a travelling pressure wave toward a limited length of said vessel and for producing an electrical voltage proportional to amounts of said travelling pressure wave which are reflected back toward said first transducer means by mechanical impedance discontinuities in the path of said travelling pressure wave;
   acquisition electrical means connected to said first transducer means and energized by said electrical voltage produced thereby for determining the presence of said vessel in the path of said travelling pressure wave and for determining the approximate depth of said vessel beneath said surface;
   diameter determining electrical means connected to said first transducer means and energized by said electrical voltage produced thereby for determining the time delay between reflections of said travelling pressure wave caused by mechanical impedance discontinuities attributable to the walls of said vessel which are closest and farthest away from said first transducer means;
   a gating means connected to said diameter determining electrical means for activating said diameter determining electrical means, said acquisition electrical means connected to said gating means for activating said diameter determining electrical means at the approximate time for reception of reflections of said travelling pressure wave from said vessel;
   and second transducer means are adapted to be positioned on said surface for determining the velocity of the fluid flowing through said vessel in said limited length thereof;
   whereby having determined the diameter of said vessel and the velocity of fluid flowing through said vessel in said limited length thereof, the volumetric flow of said fluid may be determined.

2. The flowmeter of claim 1 which further includes automatic tracking means energized from the output of said diameter determining electrical means and connected to said gating means for altering the activation time of said gating means responsive to changes in position of said vessel.

3. The flowmeter of claim 1 which includes a velocity determining electrical circuit connected to said second transducer energized by an electrical voltage produced thereby, said gating means connected to said velocity determining electrical circuit for activating said velocity determining electrical circuit when reflections of a travelling pressure wave are received from said limited length of said vessel.

4. The flowmeter of claim 3 wherein said second transducer means continuously transmits coherent pressure wave pulses of a given frequency, and a spectrum analysis means are adapted to be connected to said velocity determining circuit for determining the Doppler frequency shift between said given frequency and the frequency of the said electrical voltage produced in said second transducer means by said reflected travelling pressure wave, thereby determining the velocity of scattering particles in the fluid moving in said vessel.

5. The flowmeter of claim 4 wherein said elongated vessel is a blood conducting vessel in a living body, said first and second transducer means are adapted to be mounted in contact with the skin of said body above the general location of said vessel.

6. The flowmeter of claim 4, wherein said spectrum analysis means produces a frequency spectrum of the electrical output voltage caused by the reflections of said travelling pressure wave caused by said suspended mechanical impedance discontinuities, whereby the frequency of said electrical output voltage produced by said second transducer means may be determined by determining the peak response of said frequency spectrum.

7. The flowmeter of claim 6, wherein said electrical voltage produced by said second transducer means comprises a plurality of pulses occurring at spaced intervals within a predetermined time period such that the frequency spectrum produced by said spectrum analysis means is comprised of a series of spectral lines defined by an envelope the shape of which is dependent upon said predetermined time period and each of said spectral lines is separated by a frequency inversely proportional to the magnitude of said spaced intervals.

8. The flowmeter of claim 11, wherein said predetermined time period is approximately 15 milliseconds and the magnitude of said spaced intervals is approximately $15 \times 10^{-2}$ milliseconds.

9. The flowmeter of claim 6, wherein the magnitude of said spaced intervals is selectively chosen to produce spectral lines which are spaced from one another by an amount greater than the maximum difference in frequency expected between the transmitted and received frequencies of said second transducer means and wherein said spectrum analysis means has a pass band approximately equal to twice the magnitude of the maximum expected difference in said frequencies, whereby spectral lines of the frequency spectrum of said received frequencies other than the frequency of peak response which corresponds to the true frequency of said received frequencies will be prohibited from passing therethrough.

10. A flowmeter for determining the volumetric flow of a fluid through an elongated vessel which is located beneath a surface and has an unspecified position comprising:

first transducer means adapted to be positioned on said surface for directing a travelling pressure wave toward a limited length of said vessel and for producing an electrical voltage proportional to amounts of said travelling pressure wave which are reflected back toward said first transducer means by mechanical impedance discontinuities in the path of said travelling pressure wave;

acquisition means connected to said first transducer means and energized by said electrical voltage produced thereby for determining the presence of said vessel in the path of said travelling pressure wave and for determining the location and position of said vessel beneath said surface;

diameter determining electrical means connected to said first transducer means and energized by said electrical voltage produced thereby for determining the time delay between reflections of the travelling pressure wave perpendicular to the vessel walls caused by mechanical impedance discontinuities attributable to the walls of said vessel which are closest and farthest away from said first transducer means;

second transducer means adapted to be positioned on said surface for directing a travelling pressure wave toward said vessel at a specified angle relative to the travelling pressure wave of the first transducer means such that the travelling waves from both transducer means encounter overlapping portions of said vessel and for producing an electrical voltage proportional to amounts of said travelling pressure wave which are reflected back toward said second transducer means by scattering particles in the fluid moving in said vessel;

Doppler frequency determining electrical means connected to said second transducer means and energized by said electrical voltage produced thereby for determining the Doppler frequency shift caused by scattering particles in the fluid moving in said vessel;

velocity determining electrical means connected to said Doppler frequency determining electrical means and said transducer positioning means for determining the flow velocity of said scattering particles in the fluid moving in said vessel;

whereby having determined the diameter of said vessel and the velocity of fluid flowing through said vessel in said limited length thereof, the volumetric flow of said fluid may be determined.

11. The flowmeter of claim 10 wherein said second transducer means is energized by a voltage waveform consisting of coherent pulses and a spectrum analysis means, said spectrum analysis means connected to said velocity determining circuit for determining the Doppler frequency shift of said electrical voltage produced in said second transducer means by said reflected travelling pressure wave.

12. The flowmeter of claim 10 wherein said electrical voltage produced by said second transducer means comprises a plurality of pulses occurring at spaced intervals within a predetermined time duration such that its frequency spectrum consists of a series of spectral components separated by a frequency inversely proportional to the magnitude of said spaced intervals, each spectral component having a width which is inversely proportional to said predetermined time duration and said series of spectral components having amplitudes in part determined by the spectrum of a pulse within said plurality of pulses.

13. The flowmeter of claim 12 wherein the magnitude of said spaced intervals is selectively chosen to produce spectral components which are spaced from one another by an amount greater than the maximum difference in frequency expected between the transmitted and received frequencies of said second transducer means and which includes a spectrum analysis means which has a pass band approximately equal to twice the magnitude of the maximum expected difference in said frequencies, whereby spectral components of the frequency spectrum of said received frequencies other than the frequency of peak response which corresponds to the true frequency of said received frequencies will be prohibited from passing therethrough.

14. The flowmeter of claim 10 which includes a Doppler frequency clutter rejection means energized by said acquisition means and connected to said Doppler frequency determining means for activating said Doppler frequency determining means when reflections from a travelling pressure wave are received from said scattering particles in the fluid moving in said vessel.

15. The flowmeter of claim 10 which includes automatic tracking means and a diameter determining clutter rejection means, said automatic tracking means energized from the output of said diameter determining electrical means and connected to said diameter determining clutter rejection means for altering the activation time and duration of said diameter determining clutter rejection means in response to changes in position of said vessel.

16. The flowmeter of claim 10 wherein said elongated vessel is a blood conducting vessel in a living body, said first and second transducer means adapted to be mounted in contact with the skin of said body above the general location of said vessel.

References Cited

UNITED STATES PATENTS

| | | | |
|---|---|---|---|
| 3,354,700 | 11/1967 | Schindler | 73—67.9 |
| 2,636,383 | 4/1953 | More et al. | 73—227 |
| 2,883,860 | 4/1959 | Henry | 73—67.9 |
| 3,009,353 | 11/1961 | Erdman | 73—67.9 |
| 3,078,841 | 2/1963 | Brownson | 128—2.05 |
| 3,140,710 | 7/1964 | Glassner et al. | 128—2.05 |
| 3,149,627 | 9/1964 | Bagno | 128—2.1 |
| 3,164,007 | 1/1965 | Stebbins et al. | 73—67.9 |
| 3,280,622 | 10/1966 | Carlin | 73—67.9 |
| 3,310,049 | 3/1967 | Clynes | 128—2.05 |
| 3,309,913 | 3/1967 | Weighart | 73—67.8 |
| 3,334,622 | 8/1967 | Brech | 128—2 |

FOREIGN PATENTS

| | | |
|---|---|---|
| 925,541 | 5/1963 | Great Britain. |
| 930,689 | 7/1963 | Great Britain. |

RICHARD A. GAUDET, Primary Examiner

KYLE L. HOWELL, Assistant Examiner

U.S. Cl. X.R.

73—194, 227